United States Patent
Pekarsky et al.

(10) Patent No.: US 9,806,381 B2
(45) Date of Patent: Oct. 31, 2017

(54) SERPENTINE COOLING ELEMENT FOR BATTERY ASSEMBLY

(71) Applicant: FORD GLOBAL TECHNOLOGIES, LLC, Dearborn, MI (US)

(72) Inventors: Lev Pekarsky, West Bloomfield, MI (US); Neil Robert Burrows, White Lake Township, MI (US); Bhaskara Boddakayala, Canton, MI (US); George Albert Garfinkel, Westland, MI (US); LeeAnn Wang, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 618 days.

(21) Appl. No.: 14/156,871

(22) Filed: Jan. 16, 2014

(65) Prior Publication Data

US 2015/0200428 A1 Jul. 16, 2015

(51) Int. Cl.
*H01M 10/42* (2006.01)
*H01M 10/613* (2014.01)
*H01M 10/625* (2014.01)
*H01M 10/6568* (2014.01)
*H01M 10/647* (2014.01)
*H01M 10/6566* (2014.01)

(52) U.S. Cl.
CPC ..... *H01M 10/4207* (2013.01); *H01M 10/613* (2015.04); *H01M 10/625* (2015.04); *H01M 10/647* (2015.04); *H01M 10/6566* (2015.04); *H01M 10/6568* (2015.04); *H01M 2220/20* (2013.01)

(58) Field of Classification Search
CPC ......... H01M 10/6557; H01M 10/6567; H01M 10/6568; H01M 10/6566
See application file for complete search history.

(56) References Cited

U.S. PATENT DOCUMENTS

| 8,293,397 | B2 | 10/2012 | Uchida et al. | |
|---|---|---|---|---|
| 2005/0089750 | A1 | 4/2005 | Ng et al. | |
| 2005/0170240 | A1* | 8/2005 | German | B60L 11/1874 429/120 |
| 2009/0255109 | A1 | 10/2009 | Weber et al. | |
| 2010/0104938 | A1* | 4/2010 | Hermann | H01M 2/1077 429/120 |
| 2011/0293982 | A1* | 12/2011 | Martz | H01M 10/5004 429/120 |
| 2012/0219839 | A1 | 8/2012 | Kritzer et al. | |
| 2012/0244392 | A1* | 9/2012 | Kleiman | H01M 10/5004 429/120 |
| 2013/0071720 | A1 | 3/2013 | Zahn | |

(Continued)

FOREIGN PATENT DOCUMENTS

JP WO 2012029270 A1 * 3/2012 ......... H05K 7/20509

*Primary Examiner* — Barbara L Gilliam
*Assistant Examiner* — Robert S Carrico
(74) *Attorney, Agent, or Firm* — David Kelley; Brooks Kushman, P.C.

(57) ABSTRACT

A traction battery assembly includes a battery array with a plurality of stacked cells and a serpentine heat exchanger. The heat exchanger defines passageways for coolant to flow therethrough. The heat exchanger is interleaved with the cells such that opposite sides of each of the cells are in contact with the heat exchanger.

19 Claims, 7 Drawing Sheets

(56) References Cited

U.S. PATENT DOCUMENTS

| | | | |
|---|---|---|---|
| 2013/0157089 A1* | 6/2013 | Miyatake | H05K 7/20509 429/72 |
| 2013/0171493 A1* | 7/2013 | Wayne | F28F 3/12 429/120 |

* cited by examiner

SERPENTINE COOLING ELEMENT FOR BATTERY ASSEMBLY

TECHNICAL FIELD

The present disclosure relates to fluid transport systems for vehicle battery thermal management systems.

BACKGROUND

Vehicles such as battery-electric vehicles (BEVs), plug-in electric vehicles (PHEVs) or hybrid-electric vehicles (HEVs) contain a battery, such as a high voltage battery, to act as an energy source for the vehicle. Battery capacity and cycle life can change depending on the operating temperature of the battery. It is generally desirable to maintain the battery within a specified temperature range while the vehicle is operating or while the vehicle is charging.

Vehicles with batteries may include cooling systems to provide temperature control for the batteries to extend life and improve performance.

SUMMARY

In an embodiment, a traction battery assembly having a battery array and a serpentine heat exchanger is provided. The battery array includes a plurality of stacked cells for powering a vehicle. The serpentine heat exchanger is interleaved with the cells such that opposite sides of each of the cells are in contact with the heat exchanger. The heat exchanger defines passageways for coolant to flow therethrough to regulate the temperature of the battery assembly.

In another embodiment, a traction battery assembly having a battery array is provided. The battery array includes a plurality of cells arranged in a line, a serpentine flexible bladder interleaved with the cells, and end plates for compressing the cells and bladder. The serpentine flexible bladder defines at least one internal coolant channel. A spacing element is provided to prevent the compressed cells from fully collapsing the at least one internal coolant channel in a vicinity of the spacing element.

In yet another embodiment, a traction battery assembly having a battery array and a heat exchanger is provided. The battery array includes a plurality of cells. The heat exchanger is in contact with at least three sides of each cell in the array. The heat exchanger has an inlet port, an outlet port, and internal plumbing for circulating a coolant therethrough to remove heat from the battery array.

The above aspects of these disclosure and other aspects are described in greater detail below with reference to the attached drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
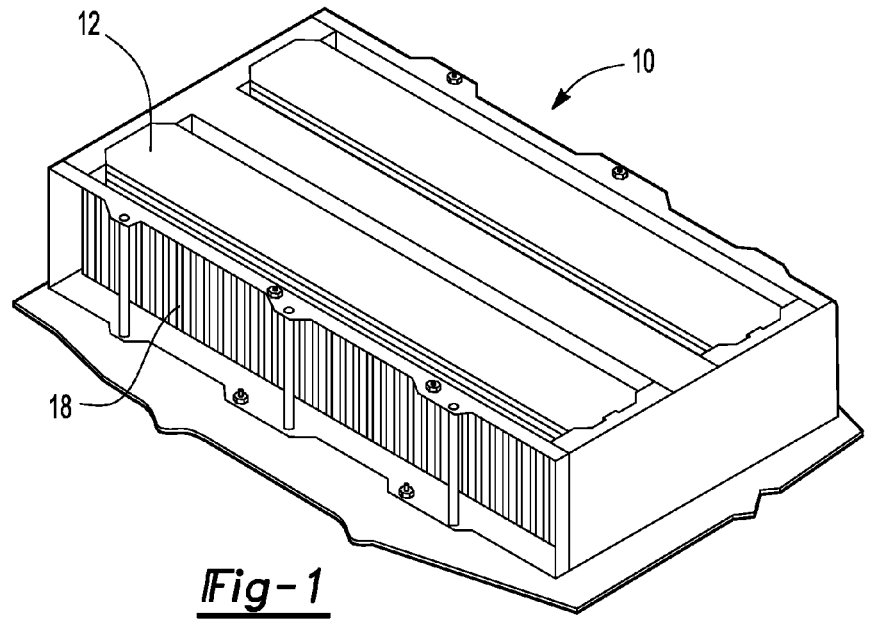
FIG. 1 is a perspective view of a battery assembly.

Referring to FIG. 1, a traction battery assembly is shown. Electric vehicles may include an energy system having a traction battery assembly 10 with components such as one or more battery cell arrays 12, a battery electrical control module (BECM), and a direct current to direct current (DC/DC) converter unit. The battery cell arrays 12 may provide energy to operate the vehicle and its systems. Each battery cell array 12 may include a plurality of battery cells 18 connected in series or parallel. The battery cells 18, such as prismatic cells, convert stored chemical energy to electrical energy. The cells 18 may include a housing, a positive electrode (cathode) and a negative electrode (anode). An electrolyte may allow ions to move between the anode and cathode during discharge, and then return during recharge. Terminals may allow current to flow out of the cell for use by the vehicle. The terminal of each battery cell may be aligned with opposing terminals (positive and negative) adjacent to one another to facilitate a series connection between the battery cells when positioned in an array.

The battery assembly may include a thermal management system to control the temperature of the battery array. The thermal management of the battery array may be accomplished by a variety of systems such as air or liquid cooled systems. A liquid cooled system may include one or more pipes, or passageways disposed within a heat exchanger to remove unwanted heat from the battery array.

Figure 2:
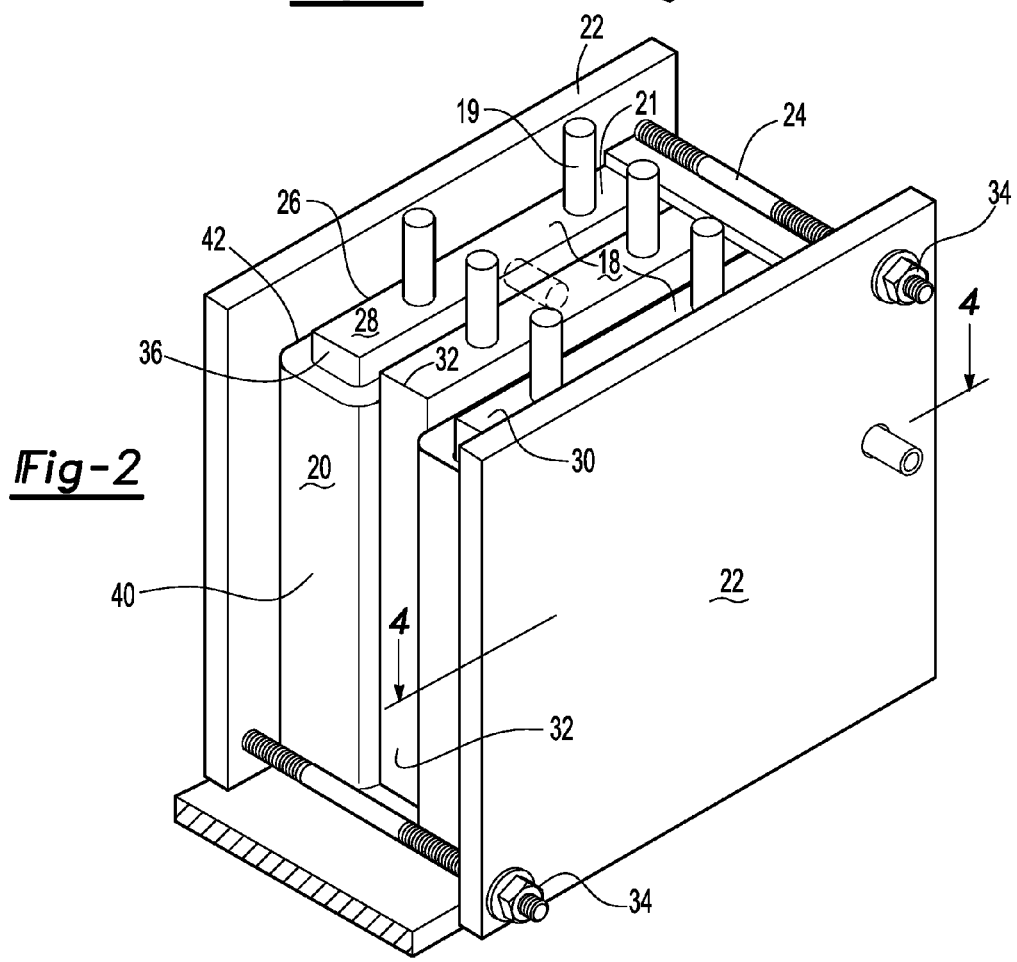
FIG. 2 is perspective view of a battery array.

FIG. 2 illustrates a battery array 12 having three cells 18 in a stacked configuration and a heat exchanger or bladder 20 interleaved between the cells 18. The three cell embodiment is for illustration purposes only and in actual application, the number of cells in the array may be greater. The cells 18 and heat exchanger 20 are secured together by a pair of end plates 22 and brackets 24. The brackets 24 and endplates 22 also secure the cells 18 and heat exchanger 20 to the battery assembly 10. The end plates 22 boarder a side portion 26 of the first and last cells 28, 30 and prevent the cells 18 from moving forward or backward. Each cell 18 also includes a terminal 19 extending from a terminal side 21 of the cell. Four brackets 24 (only one shown) disposed at the four outer edges 32 of each cell 18 secure the cells 18 in the lateral and vertical directions. The endplates 22 and brackets 24 are secured together with fasteners 34. For example, four bolts in each corner of the end plates 22 may connect the end plates 22 and brackets 24 together. The endplates 22, brackets 24 and fasteners 34 may cooperate to provide compression to the cells 18.

The heat exchanger 20 is serpentine in shape and wraps around alternating end portions 36 of each cell 18 such that the side portions major sides) 26 of each cell 18 are in contact with the heat exchanger 20. The heat exchanger has panel portions 42 disposed along the side portions 26 and bent portions 40 disposed at the end portions 36. The serpentine shape increases surface area between the heat exchanger 20 and cells 18 to increase the heat dissipation capacity as compared to other solutions.

Figure 3:
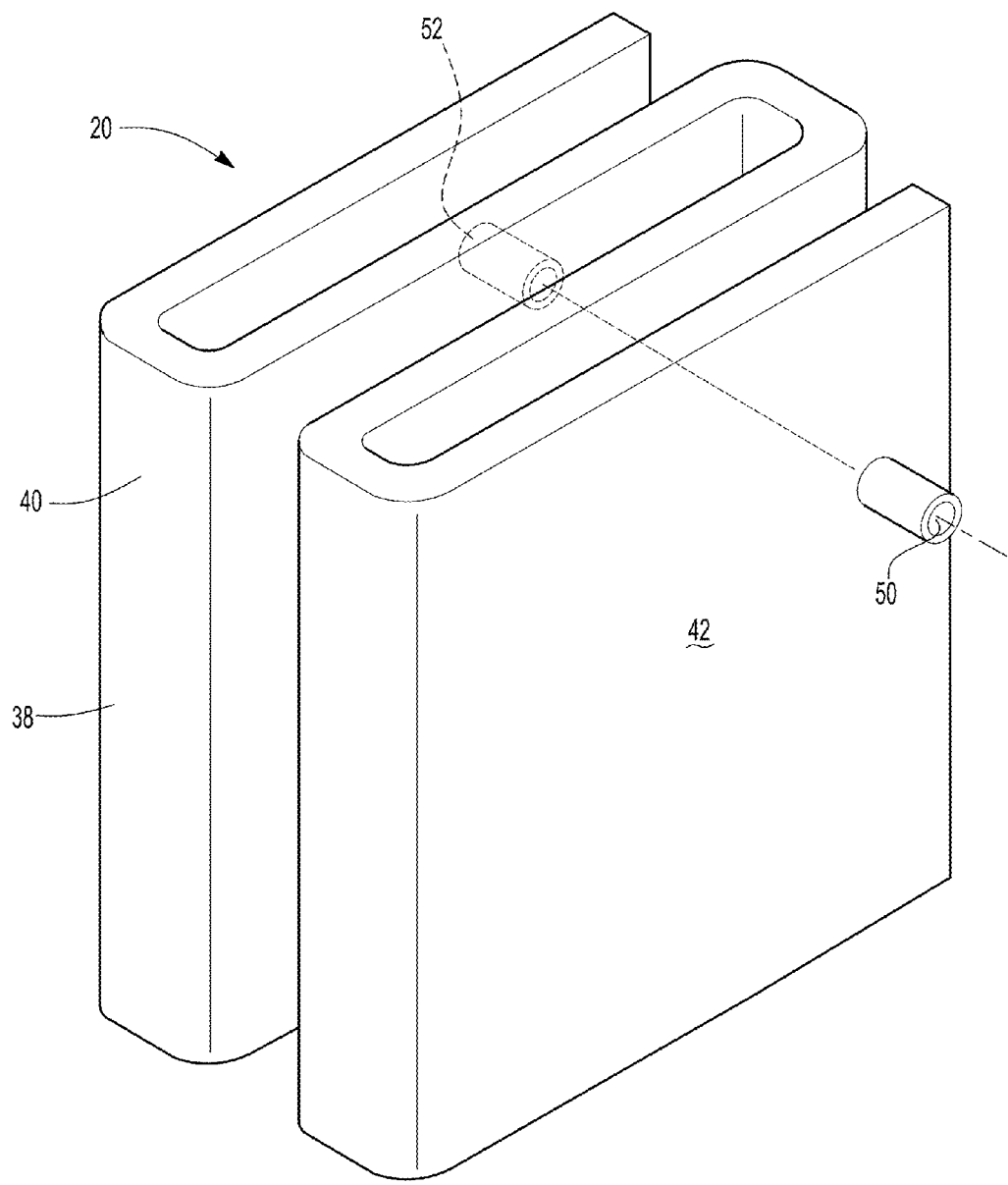
FIG. 3 is a perspective view of a heat exchanger removed from a battery array.

Referring to FIG. 3, a heat exchanger or bladder 20 is shown removed from the battery array. The heat exchanger 20 is formed of thin flexible membranes 38. The membranes range in thickness between 0.1 to 1.0 millimeters (mm). The material of the membranes 38 may be made of any flexible material such as rubber, nylon, or plastic. In certain applications, it may be advantageous to have the material be a thermally enhanced material. The heat exchanger 20 is flexible allowing it to bend around the cells 18 (not shown). The membranes 38 define internal passageways for directing a coolant medium. Coolant is cycled through the passageways through the inlet port 50 and outlet port 52. The bent portions 40 are continuous with the panel portions 42 forming a continuous structure having no joints. This lack of joints reduces leakage and flow resistance problems. It also eliminates the need for gaskets or other additional parts. The heat exchanger 20 is expandable. The coolant medium during operation exerts pressure on the heat exchanger 20 and inflates the heat exchanger 20 to fill the gap between adjacent cells. The gap between adjacent cells is typically less than 2.0 mm. An expandable heat exchanger 20 reduces stack up issues and provides better contact with the cells 18 than a rigid heat exchanger.

Figure 4:
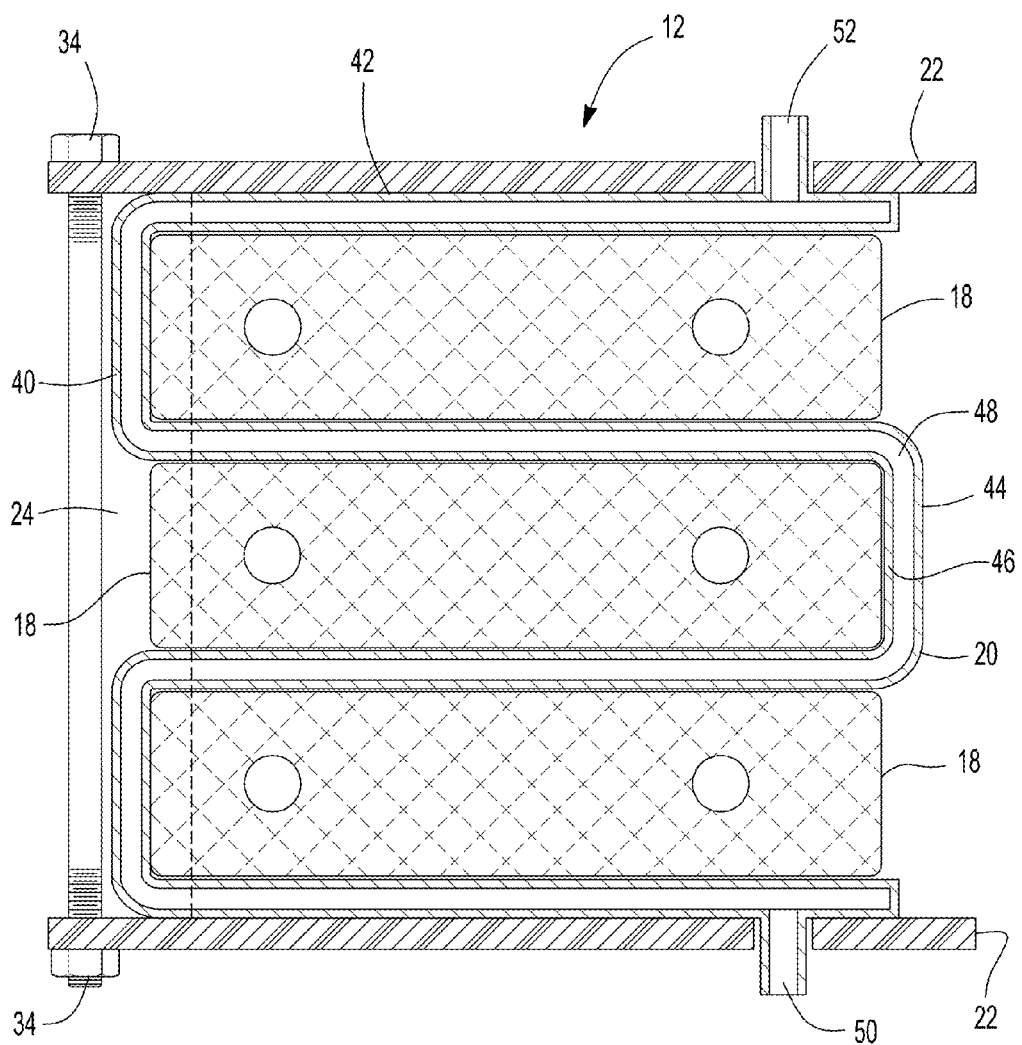
FIG. 4 is section view along line 4-4 showing a top cross-section of the battery array of FIG. 2.

Referring to FIG. 4, a section view along line 4-4 of the battery array 12 shown in FIG. 2 is illustrated. The heat exchanger 20 includes a first membrane 44 and a second membrane 46. The first and second membranes 44, 46 are joined along all edges and define at least one passageway or channel 48 in between the membranes. The first membrane 44 and the second membrane 46 are joined only at the edges to form a single passageway 48 that resembles a pocket. Alternatively, the membranes may be joined at the edges and internally to form a plurality of parallel passageways. The first and second membranes 44, 46 may be joined together by connecting additional membranes in between the first and second membranes 44, 46. Alternatively, the first and second membranes 44, 46 may be welded together along a seam. The passageway 48 is in fluid communication with the inlet port 50 and the outlet port 52. Coolant is cycled between the inlet and outlet ports 50, 52 through the passageway 48 during operation. The passageways 48 may run continuously along the length of the heat exchanger 20 from the inlet port 50 to the outlet port 52. Alternatively, the passageways 48 may run along the width of the heat exchanger 20.

Figure 5:
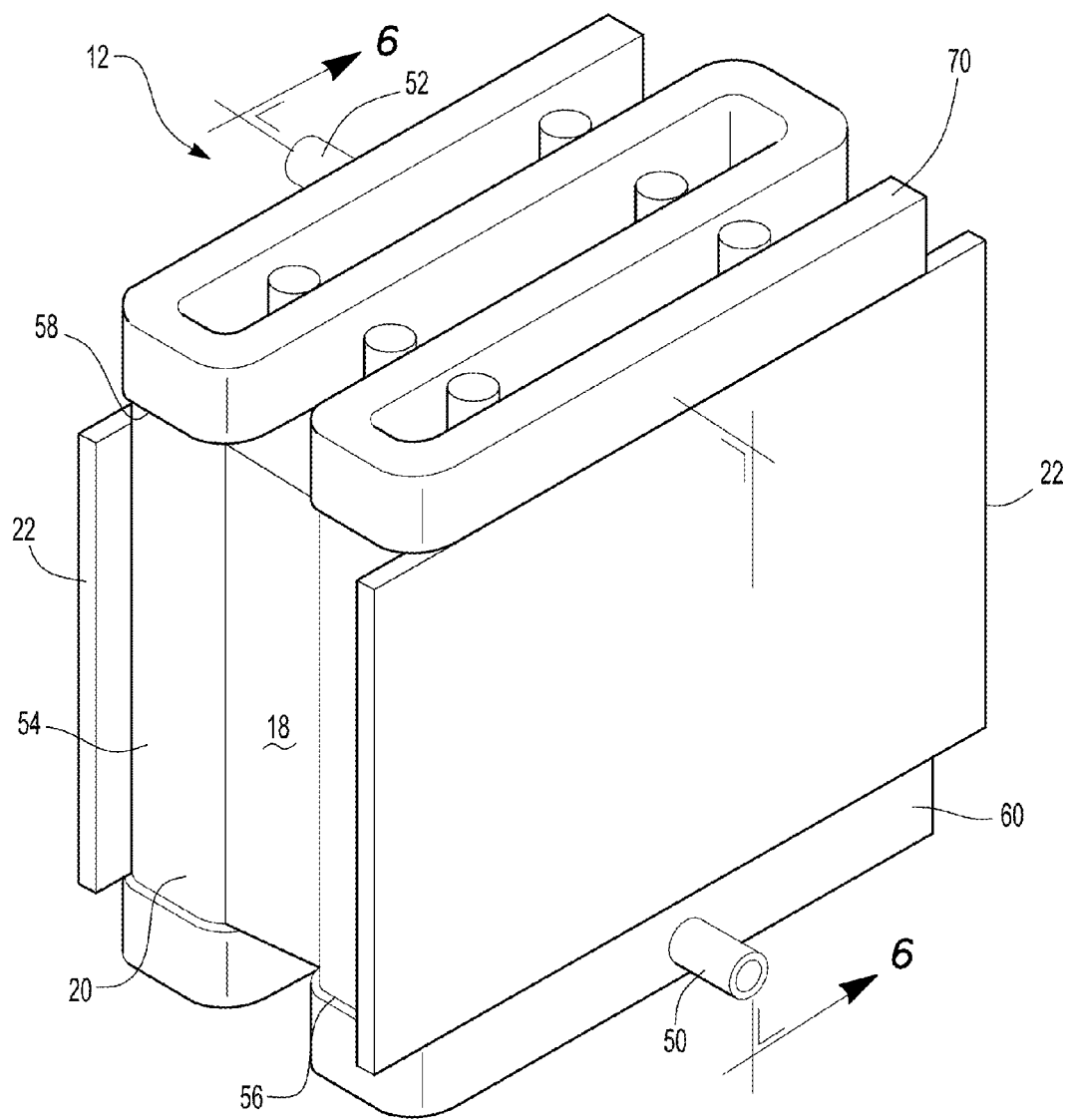
FIG. 5 is a perspective view of a battery array.
Figure 6:
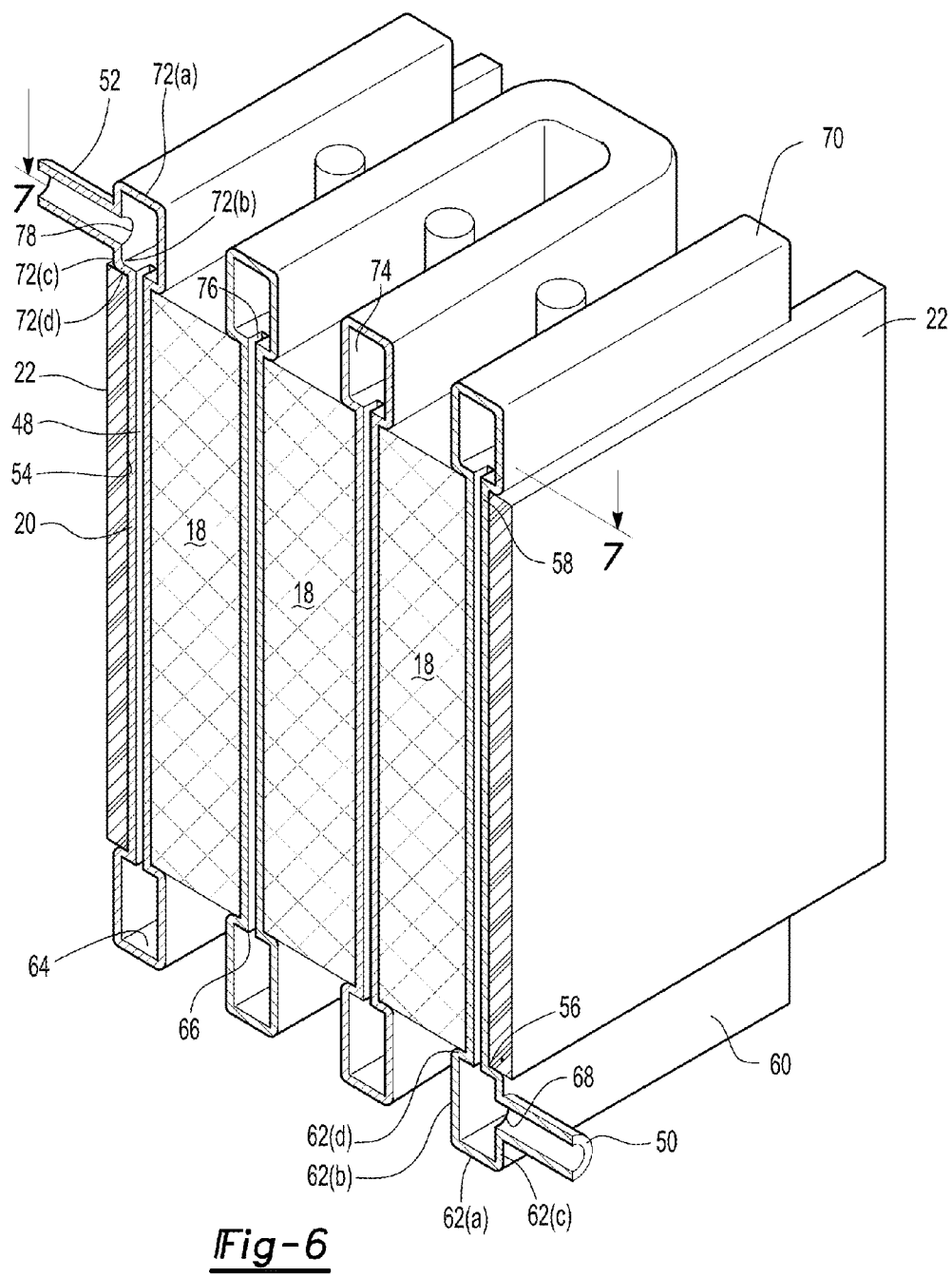
FIG. 6 is section view along line 6-6 showing a side cross-section of the battery array of FIG. 5.
Figure 7:
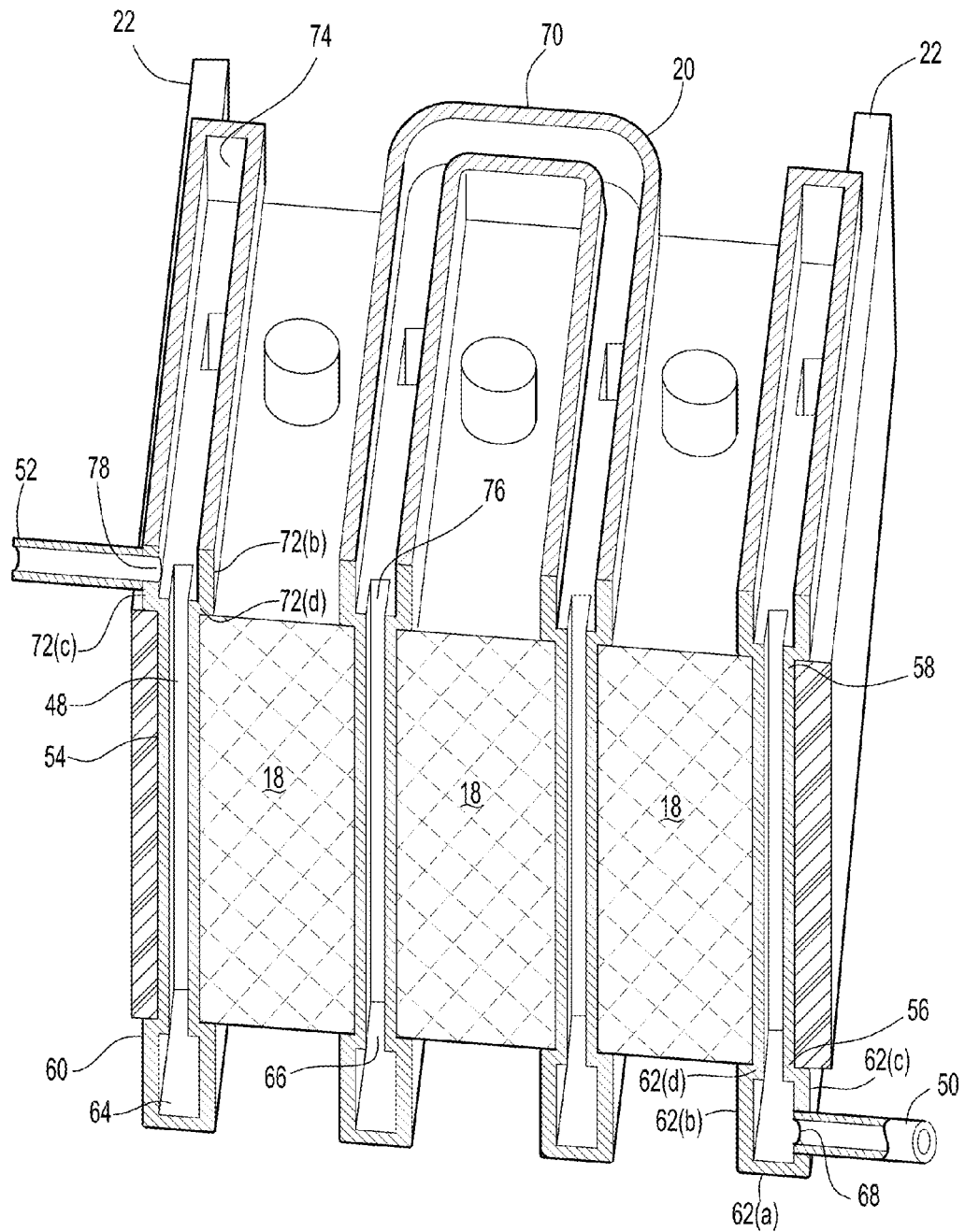
FIG. 7 is section view along line 7-7 showing a top cross-section of the battery array of FIG. 6.

Referring to FIGS. 5, 6, and 7, a battery array 12 of an alternative embodiment is shown. The battery array 12 comprises a plurality of cells 18 arranged in a line. The cells 18 are secured by an end plate arrangement 22. A serpentine heat exchanger 20 is wrapped around the cells 18 to remove unwanted heat from the cells. The heat exchanger 20 has a main body 54 with a lower portion 56 and an upper portion 58. An inlet manifold 60 is disposed along the main body 54 at the lower portion 56. The inlet manifold 60 includes four walls 62a-62d interconnected to define a chamber 64. The inlet manifold 60 has an inlet port 50 in wall 62(c) for receiving coolant into the manifold.

An outlet manifold 70 is disposed along the main body 54 at the upper portion 58. The outlet manifold 70 includes four walls 72a-72d interconnected to define a chamber 74. The outlet manifold 70 is in fluid communication with the main body 54. The outlet manifold 70 has an outlet port 52 in wall 72(c) for receiving coolant into the manifold. In the illustrated embodiment, the heat exchanger 20 has a unitary construction with the main body 54 and the manifolds 60, 70 being integrally formed with each other. As such, the wall 62(d) and the wall 72(d) are also part of the main body 54.

A plurality of parallel channels 48 are defined by the main body 54. The channels 48 connect the inlet and outlet manifolds 60, 70 in fluid communication. The holes (ports) 66 connect the channels 48 and the inlet manifold 60 in fluid communication. The holes (ports) 76 connect the channels 48 and the outlet manifold 70 in fluid communication.

In operation, coolant is pumped into the inlet manifold 60 through the inlet port 50 and accumulates in the chamber 64 of the inlet manifold 60. Coolant flows from the inlet manifold 60 into the internal channels 48 as the pressure increases in the inlet manifold 60. Coolant then flows from the internal channels 48 into the outlet manifold 70 as pressure is further increased. The coolant then flows along the chamber 74 of the outlet manifold 70 and exits the heat exchanger 20 through the outlet port 52. As the coolant circulates between the inlet and outlet ports 50, 52, unwanted heat is removed from the battery array 12. The manifold embodiment provides a lower and more uniform temperature differential (delta T) among the cells in the array because the coolant only flows across a width of the heat exchanger rather than along the entire length of the heat exchanger. Having a lower delta T may provide for more uniform temperature throughout the array. It may also provide for more efficient thermal management.

Figure 8:
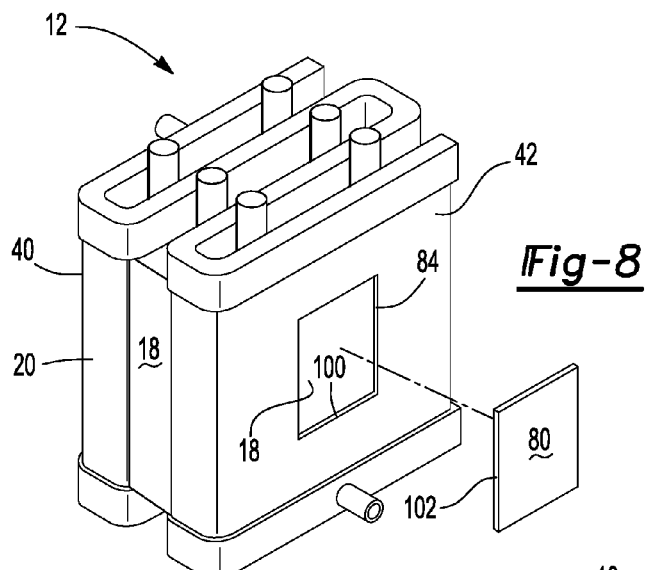
FIG. 8 is a perspective view of a battery array.

Referring to FIG. 8, a battery array 12 of an alternative embodiment is shown. As described above, the battery cells 18 may be packaged under compression. The compressive forces may be enough to collapse the heat exchanger 20 and block the internal passageways or channels 48. A spacer 80 prevents collapse of at least some of the passageways 48. The serpentine heat exchanger 20 has a plurality of panel portions 42 disposed between the side portions 26 of the cells 18. The panel portions 42 define a cutout portion 84 for receiving the spacing element 80 therein. The cutout 84 may include a perimeter wall 100 and the spacer 80 may include an edge portion 102. The spacing element 80 is in direct contact with corresponding cells 18 and prevents the passageways 48 in a vicinity of the spacing element 80 from collapsing. The spacing element 80 could be a rigid spacer or could be a flexible spacer.

Figure 9:
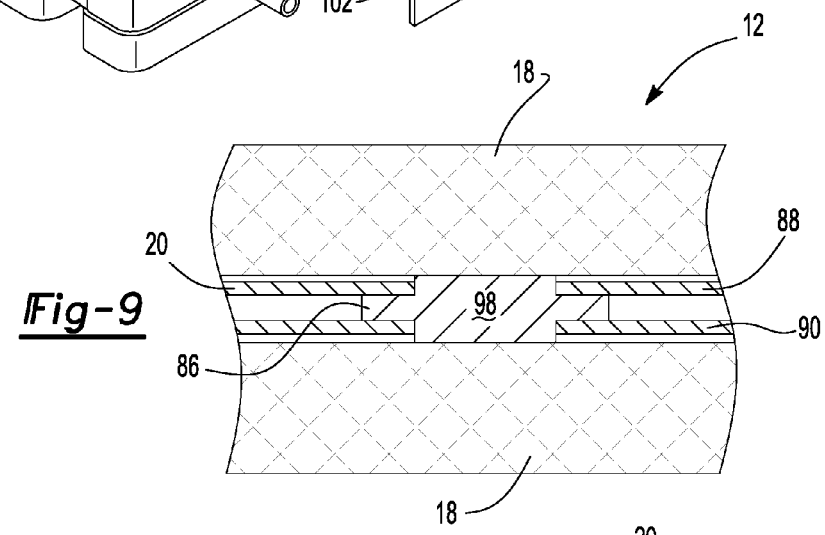
FIG. 9 is a top cross-section view of the battery array of FIG. 8.

Referring to FIG. 9, a top cross-section view is shown for the battery array. A spacing element 98 is disposed between a pair of adjacent cells 18 and prevents collapse of the heat exchanger 20. The spacing element 98 has a plurality of tongues 86 which cooperate with the first wall 88 and the second wall 90 to hold the spacing element in place. For example, the heat exchanger may have grooves (not shown) for receiving the tongues 86. Alternatively, the grooves may be omitted with the first and second walls 88, 90 being attached directly to the tongues 86. In this alternative, the tongues 86 seal the passages 48 at the cutout portion 84.

Figure 10:
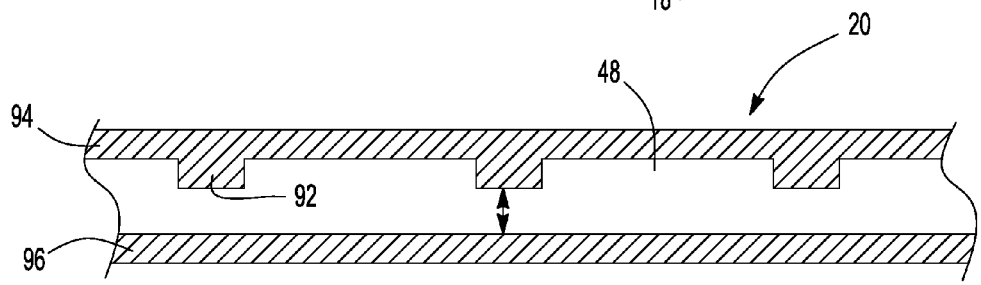
FIG. 10 is a top cross-section view of a heat exchanger according to an alternative embodiment.

FIG. 10 is a top cross-section view of the heat exchanger 20 showing an internal spacing element located within the passageways. The heat exchanger 20 has a first wall 94 and a second wall 96 defining a passageway 48. The first wall 94 has a plurality of protrusions 92 and the second wall 96 is smooth. The protrusions 92 extend inwardly from the first wall 94 into the passageway 48. The protrusions 92 engage with the second wall 96 to prevent full collapse of the passageway 48 when under compression. The pump (not shown) may supply sufficient fluid pressure to the heat exchanger 20 to fully open the passageway 48 during operation.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A traction battery comprising:
    a plurality of cells stacked in an array, wherein each of the cells have opposing major sides; and
    a serpentine heat exchanger including
        a body interleaved with the cells and including opposing panels disposed against the major sides, and including first and second edges each interconnecting the panels and extending along a length of the serpentine of the heat exchanger,
        an inlet manifold cooperating with the first edge to define an inlet chamber extending along the length of the serpentine, and
        an outlet manifold cooperating with the second edge to define an outlet chamber extending along the length of the serpentine, wherein the body defines at least one passageway extending between the inlet and outlet chambers to place the chambers in fluid communication such that coolant flows from the inlet manifold to the outlet manifold in a parallel cooling circuit.

2. The traction battery of claim 1 wherein the passageway extends between the chambers at an angle perpendicular to the first and second edges.

3. The traction battery of claim 1 wherein the inlet manifold further includes a pair of opposing sidewalls each extending from the first edge, and a top wall interconnecting the sidewalls to define the inlet chamber.

4. The traction battery of claim 3 wherein a distance between the opposing sidewalls is greater than a distance between the panels.

5. The traction battery of claim 1 wherein the passageway is a plurality of passageways that each includes an inlet port defined in the first edge and an outlet port defined in the second edge.

6. The traction battery of claim 1 wherein the passageway defines a hole in the first wall.

7. The traction battery of claim 1 wherein each of the cells further includes a terminal side having at least one terminal, and wherein an outer surface of one of the inlet and outlet manifolds is disposed against the terminal side.

8. The traction battery of claim 1 wherein the inlet and out manifolds are each outside of a footprint of the major sides.

9. A traction battery comprising:
    cells each having major sides; and
    a serpentine bladder interleaved with the cells and including
        a body portion having opposing panels in contact with the major sides and interconnected by a wall extending along a length of the serpentine bladder, and
        a manifold extending along an entire length of the wall and cooperating with the wall to define a chamber in fluid communication with a passageway defined between the panels.

10. The traction battery of claim 9 wherein the wall defines a hole that places the passageway and the chamber in fluid communication.

11. The traction battery of claim 9 wherein the manifold further includes a pair of opposing sidewalls each extending from the wall, and a top wall interconnecting the sidewalls to define the chamber.

12. The traction battery of claim 11 wherein a distance between the opposing sidewalls is greater than a distance between inside surfaces of the panels.

13. The traction battery of claim 9 wherein the manifold is disposed outside a footprint of the major sides.

14. The traction battery of claim 9 wherein each of the cells further includes a terminal side having at least one terminal disposed thereon, and wherein an outer surface of the manifold is disposed against each of the terminal sides.

15. The traction battery of claim 9 wherein the passageway is a plurality of passageways that each extend from the wall such that a longitudinal axis of the passageway is perpendicular to the wall.

16. The traction battery of claim 9 wherein the body portion further includes a second wall interconnecting the panels and extending along the length of the bladder, wherein the bladder further includes a second manifold extending along the second wall and cooperating with the second wall to define a second chamber in fluid communication with the passageway.

17. The traction battery of claim 16 wherein the passageway is a plurality of passageways that each include a first port defined in the wall and a second port defined in the second wall.

18. A traction battery comprising:
    an array of cells each having major sides;
    a serpentine heat exchanger interleaved with the cells and including spaced panels defining passageways for coolant to flow therethrough and disposed against the major sides, wherein the panels cooperate to define a cutout extending through an entire thickness of the heat exchanger; and
    a spacer disposed in the cutout and directly engaging between an adjacent pair of the major sides.

19. The traction battery of claim 18 wherein the spacer further includes a projection sandwiched between inside surfaces of the panels.

\* \* \* \* \*